United States Patent [19]

Clos

[11] Patent Number: 5,348,140
[45] Date of Patent: Sep. 20, 1994

[54] CONVEYOR ROLLER SYSTEM AND METHOD

[75] Inventor: Jeffrey P. Clos, Crescent Springs, Ky.

[73] Assignee: T.K.F. Inc., Cincinnati, Ohio

[21] Appl. No.: 62,048

[22] Filed: May 12, 1993

Related U.S. Application Data

[63] Continuation of Ser. No. 891,758, Jun. 1, 1992, abandoned.

[51] Int. Cl.⁵ ............................................. B65G 13/07
[52] U.S. Cl. ............................... 198/790; 198/780
[58] Field of Search .............. 198/789, 790, 834, 835, 198/780; 474/159, 160, 152

[56] References Cited

U.S. PATENT DOCUMENTS

| | | | |
|---|---|---|---|
| 1,897,352 | 2/1933 | Wilson et al. | |
| 2,338,107 | 8/1967 | Kiekhaefer | 74/229 |
| 3,581,360 | 6/1971 | Penn | 29/116 |
| 3,618,418 | 11/1971 | Chittenden | 74/422 |
| 3,902,589 | 9/1975 | Bylsma | 198/127 |
| 3,961,700 | 6/1976 | Fleischaver | 198/127 |
| 4,013,161 | 3/1977 | Nelson | 198/789 X |
| 4,037,334 | 7/1977 | Plemitscher | 198/834 |
| 4,072,062 | 2/1978 | Morling et al. | 198/834 |
| 4,279,337 | 7/1981 | Kachnik | 198/472 |
| 4,337,672 | 6/1982 | Shiber | 198/834 X |
| 4,583,637 | 4/1986 | Ferguson | 198/790 X |
| 4,634,409 | 1/1987 | Johnson et al. | 474/152 |
| 4,887,707 | 12/1989 | Harms | 198/781 |
| 4,930,618 | 6/1990 | Roh | 198/790 X |
| 4,993,541 | 2/1991 | Roh | 198/790 X |
| 5,040,669 | 8/1991 | Blöcker | 198/790 X |

FOREIGN PATENT DOCUMENTS

| | | | |
|---|---|---|---|
| 0341468 | 11/1989 | European Pat. Off. | 198/790 |
| 2812035 | 9/1979 | Fed. Rep. of Germany | 198/789 |
| 3124320 | 1/1983 | Fed. Rep. of Germany | 474/152 |
| 3516097 | 11/1986 | Fed. Rep. of Germany | 198/789 |
| 2233422 | 1/1991 | United Kingdom | 474/152 |

Primary Examiner—Cheryl L. Gastineau
Attorney, Agent, or Firm—Mueller and Smith

[57] ABSTRACT

The present invention relates to a conveyor roller, system and method. The roller has a cylindrical barrel portion and a plurality of radially-disposed, recessed splines that are integrally-formed into at least one end or intermediate the ends of the barrel portion. The recessed splines are configured to receive a drive belt which imparts rotational motion to the roller. The disclosed conveyor roller system employs a plurality of these rollers disposed in spaced-apart, parallel adjacency between a pair of parallel frame members. Each pair of adjacent rollers is coupled by a belt, preferably having a succession of parallel, lateral projections (e.g. ribbed) on an inner surface for engaging the recessed splines of the rollers which it couples. Alternatively, the rollers may be coupled by a single, continuous belt. Power to drive the rollers may be supplied by coupling a drive motor to one of the rollers with another ribbed drive belt for engaging the recessed splines of the roller to which it is coupled. The drive motor may have a shaft with a plurality of parallel, radially disposed recessed splines integrally-formed therein and configured to receive the ribs of the drive belt. Alternatively, a standard gear pulley may be mounted onto the drive shaft for powering the drive belt. A method using the instant invention for driving a conveyor roller system for transporting articles across a plurality of parallel, spaced-apart rollers connected axially between a pair of parallel frame members is also disclosed. The rollers are provided with a plurality of parallel, radially-disposed recessed splines integrally-formed about a portion thereof. These recessed splines are engaged with a belt to thereby couple the rollers. The coupled rollers are then rotated with a drive that is coupled to at least one of the rollers.

21 Claims, 2 Drawing Sheets

CONVEYOR ROLLER SYSTEM AND METHOD

This application is a continuation, of application Ser. No. 07/891,758, filed Jun. 1, 1992, abandoned.

BACKGROUND OF THE INVENTION

Conveyor roller systems are used by the manufacturing and transport, as well as other, industries in the movement of goods. Conventional systems, such as those shown in U.S. Pat. Nos. 3,618,418 and 4,279,377, employ rollers having gear teeth or sprockets affixed to an end for engaging a chain or a toothed belt coupled to a drive motor. However, inasmuch as these gear teeth or sprockets typically are swaged or welded onto an end of the roller, the cost of such a roller is increased over the cost of the roller alone. Moreover, since the sprockets or gear teeth protrude from the roller, any frame used to support the rollers must be designed with extra clearance to accommodate the protrusions. The use of the sprockets or gear teeth also serves as a limitation on the proximity with which rollers in a conveyor series may be spaced as a distance at least equal to the diametric extent of the sprocket or gear must be provided between each roller. Thus, there remains a continuing need for an improved roller and conveyor system that eliminates the increased cost and design problems associated with conventional gear-toothed or sprocketed rollers.

BROAD STATEMENT OF THE INVENTION

The present invention relates to a roller for a conveyor system or the like which overcomes the expense and design deficiencies associated with rollers heretofore known in the prior art. By integrally-forming about the barrel portion of the roller a plurality of radially-disposed, recessed splines configured to receive a series of lateral projections, e.g. ribs, disposed on an inner surface of a drive belt, the roller may be manufactured at a cost savings over rollers having swaged or welded gear teeth or sprockets. Moreover, inasmuch as the splines incorporated into the instant roller are recessed rather than protruding, a frame used to support the roller may be designed without the extra clearance needed to accommodate sprockets or gear teeth. To advantageously accommodate design considerations, the recessed splines may be integrally-formed about the barrel portion of the roller on at least one end or intermediate the ends.

It is, therefore, a feature of the invention to provide for a roller for a conveyor system or the like having a cylindrical barrel portion with a plurality of parallel, radially-disposed recessed splines integrally formed into at least one end or intermediate the ends thereof. The splines may be configured to receive a drive belt and may be integrally formed into the roller by crimping of the barrel.

It is a further feature of the invention to incorporate the instant roller into a conveyor system. The system may have a pair of parallel frame members and a plurality of parallel, spaced-apart rollers extending between and axially connected to the parallel frame members. Each of the rollers may have integrally-formed into at least one end or intermediate the ends a plurality of parallel, radially-disposed recessed splines. A series of belts coupling each pair of adjacent rollers may be provided for rotating the rollers. Alternatively, a single, continuous belt coupling each roller may be used. The belts may be provided with inner surfaces having a succession of ribs or lateral projections for engaging the recessed splines of the rollers, though even a smooth belt may function efficaciously if under sufficient tension to grip the recessed splines over which it rides. A drive mechanism or means may be provided and coupled to at least one of the rollers for transmitting power to effect rotation of the roller system. The coupling of the drive belt to the roller may be effected by a drive belt coupled to at least one splined roller. The drive mechanism or means may be provided with a drive shaft having a plurality of integrally-formed, parallel recessed splines that are radially-disposed and configured to receive the ribbed drive belt. As an alternative, a standard gear pulley may be mounted onto the drive shaft for powering the drive belt.

It is still a further feature of the invention to provide a method for driving a conveyor roller system for transporting articles across a plurality of parallel, spaced-apart rollers connected axially between a pair of parallel frame members. The rollers are provided with a plurality of parallel, radially-disposed recessed splines integrally-formed about a portion thereof. These recessed splines are engaged with a belt to thereby couple the rollers. The coupled rollers are then rotated with a drive that is coupled to at least one of the rollers.

These and other features will be readily apparent to those skilled in the art based upon the disclosure contained herein.

These drawings will be described in detail in connection with the Detailed Description of the Invention which follows.

DETAILED DESCRIPTION OF THE INVENTION

Figure 1:
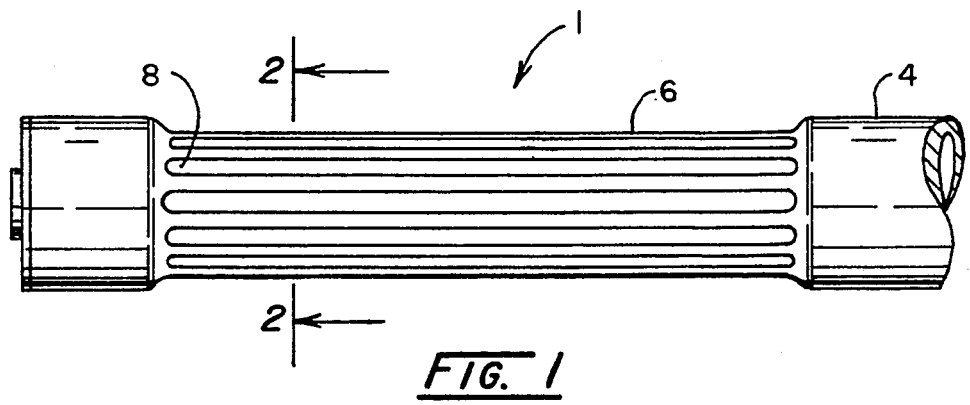
FIG. 1 is an isometric view of a roller according to the instant invention.
Figure 2:
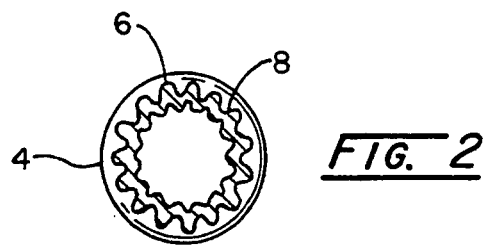
FIG. 2 is a cross-sectional view taken along the reference line 2—2 of the roller depicted in FIG. 1.

Referring initially to FIG. 1, a roller according to the instant invention is shown generally at 1. The roller has cylindrical barrel portion, 4. About at least one end, e.g. end 6, are integrally-formed a plurality of recessed splines, 8, configured to receive a drive belt. By integrally-incorporating recessed splines 8 into barrel portion 4, the expense of having to weld or swage gear teeth or a sprocket onto end 6 of roller 1 is eliminated. Moreover, inasmuch as splines 8 are recessed and do not protrude as would gear teeth or a sprocket, a frame support for roller 1 may be designed without having to consider how to accommodate the projections of a sprocket or gear teeth. Preferably, as shown in FIG. 2, recessed splines 8 may be integrally incorporated into end 6 of barrel 4 by its crimping. Although applications for the instant inventive roller, 1, will be illustrated in connection with its incorporation into a conveyor roller system, it may be understood that roller 1 is adaptable for incorporation into any system utilizing gear pulleys, belts and the like such as, for example, transmission systems.

Figure 3:
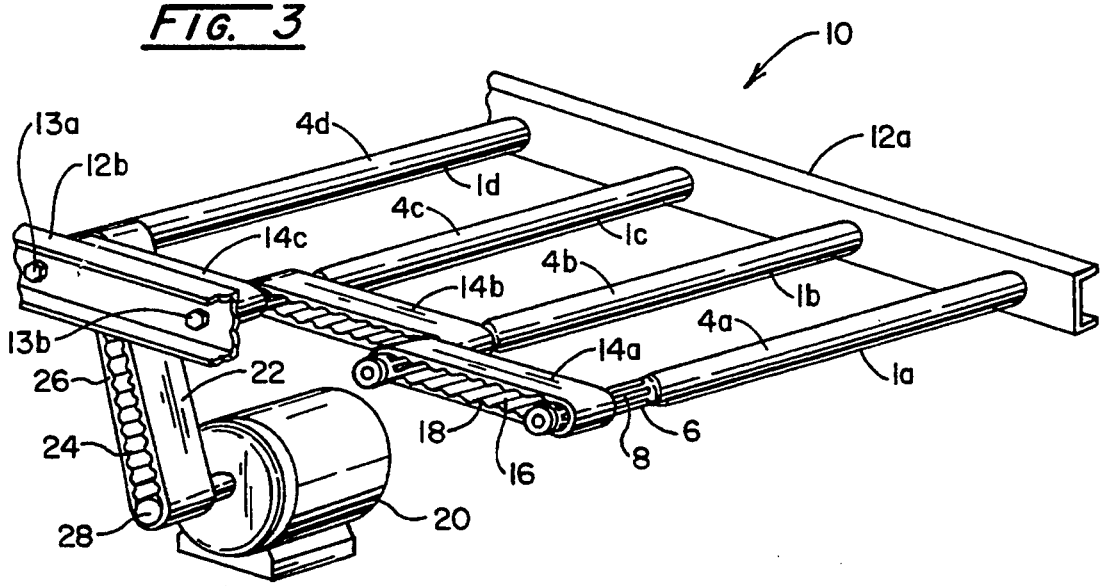
FIG. 3 is a fragmentary perspective view of one embodiment of a conveyor roller system according to the instant invention.

Referring next to FIG. 3, a conveyor roller system for transporting articles across the surfaces of a plurality of rollers is shown generally at 10. The articles transported may be, for example, manufactured goods or containers for holding manufactured goods. Advantageously, conveyor roller system 10 may be driven using roller 1 by positioning a plurality of rollers, 1a–d, in spaced-apart, parallel adjacency between parallel frame members, 12a and 12b. The distance provided between rollers 1a–d generally is a function of the geometry of the articles or article carriers to be transported across barrel portion s 4a–d or rollers 1a–d. That is, the spacing between rollers 1a–d may be selected as effective to transport articles or article carriers across barrel portions 4a–d when rollers 1a–d are rotated. Also depending upon the geometry of the articles or article carriers to be conveyed, upstanding walls may be provided to extend upwardly from parallel frame members 12a and 12b to retain the article or article carriers being transported across rollers 1a–1d. Rollers 1a–d may be axially affixed to frame members 12a and 12b by means of hexagonal fasteners 13a–b. A series of belts, 14a–c, may be seen to couple each pair of adjacent rollers 1a–d. Advantageously, belts 14a–c may be formed of an elastomeric material such as rubber, neoprene, or the like; a nylon; or of a composite material such as a reinforced rubber, neoprene, nylon, or the like. Belts formed of an elastomeric or composite material or the like are commercially available and are preferred over metal link chain inasmuch as elastomeric belts are quieter and generally allow for much higher conveyor speeds. Moreover, elastomeric or composite belts facilitate conveyor roller system 10 assembly that belts 14a–c can be positioned around successive pairs of rollers 1a–d prior to their positioning in parallel frame members 12a and 12b. Preferably, each belt, 14a–c, may have on an inner surface, e.g. inner surface 16 of belt 14a, a succession of parallel, lateral projections or ribs, 18, for engaging recessed splines 8 of rollers 1a–d. Alternatively, tensioning of belt 14a between a pair of splined rollers could create sufficient grip so that a smooth inner surface could be used.

Power to rotate rollers 1a–d may be supplied by a drive motor, 20, coupled to at least one of the rollers, for example, roller 1d. Depending upon design considerations, drive motor 20 may be coupled to a gear reducer to reduce roller speed and to concomitantly increase driving torque. The power-transmitting coupling between drive motor 20 and roller 1d may be effected by means of a drive belt, 22. Preferably, drive belt 22 has on an inner surface, 24, a succession of parallel, lateral projections, 26, engaging recessed splines 8 of roller 1d. Advantageously, drive motor 20 may be provided with a drive shaft, 28, also having a plurality of integrally-formed, radially-disposed recessed splines configured to receive lateral projections 26 of drive belt 22. Alternatively, a gearbelt pulley of a standard design may be mounted onto drive shalt 28 for powering drive belt 22.

Figure 4:
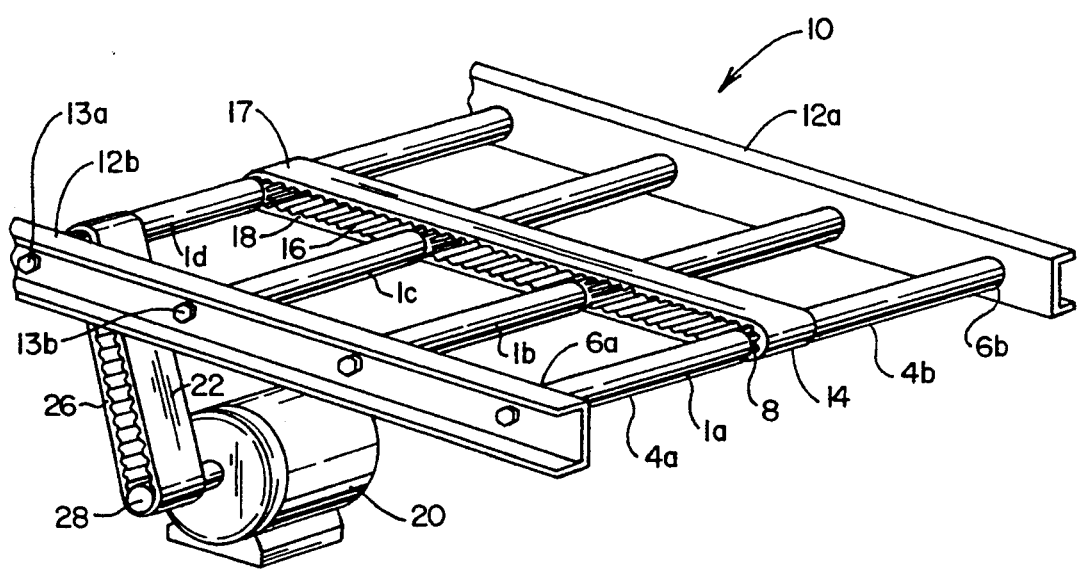
FIG. 4 is a fragmentary perspective view of another embodiment of a conveyor roller system according to the instant invention.

As may be revealed with reference to FIG. 4 and in particular to conveyor roller 1a, although rollers 1b–f generally will be similarly configured, recessed splines 8 may be integrally-formed about barrel portion 4 of roller 1a intermediate ends 6a and 6b to from barrel portions 4a and 4b. As a consequence of incorporating recessed splines 8 intermediate ends 6a and 6b of roller 1a, considerable freedom is given to the designer with respect to the lengthwise extents of barrel portions 4a–b. For example, the lengthwise extents of barrel portions 4a and 4b may be minimized, facilitating the conveyance of articles or article carriers directly on outer surface 17 of belt 14 which may be sized accordingly. Alternatively, the lengthwise extents of barrel portions 4a and 4b may be selected as effective to transport, for example, an article carrier having a U-shaped cross-section. Advantageously, belt 14 may be a single, continuous belt coupling conveyor rollers 1a–f. The tension of belt 14 may be controlled by providing a tension or idler roller slidably, movably mounted or spring-biased for engagement of outer surface 17 of belt 14.

Since certain changes may be made in the above system and apparatus without departing from the scope of the invention herein involved, it is intended that all matter contained in the above description or shown in the accompanying drawings shall be interpreted as illustrative and not in a limiting sense.

I claim:

1. A roller comprising:
   (a) a cylindrical barrel portion of a given lengthwise extent; and
   (b) a plurality of parallel, radially-disposed recessed splines integrally-formed about said barrel portion intermediate the ends of said barrel portion, said splines configured to receive a drive belt for imparting rotational motion to said roller.

2. The roller of claim 1 wherein said splines are integrally-formed about said barrel portion by crimping.

3. A conveyor roller system comprising:
   (a) a pair of parallel frame members;
   (b) a plurality of parallel, spaced-apart rollers extending between and axially connected with said parallel frame members, each of said rollers having integrally-formed about a portion thereof intermediate its ends a plurality of parallel, radially-disposed recessed splines;
   (c) a belt engaging said recessed splines of said rollers for coupling said rollers;
   (d) at least one drive coupled to at least one said roller for imparting rotational motion thereto.

4. The conveyor roller system of claim 3 wherein said belt has a ribbed inner surface for engaging said recessed splines of said rollers.

5. The conveyor roller system claim 3 wherein said drive is coupled to at least one of said rollers by a drive belt having an inner ribbed surface for engaging said recessed splines of said rollers.

6. The conveyor roller system of claim 5 wherein said drive is a drive motor having a drive shaft connected to said drive belt.

7. The conveyor roller system of claim 6 wherein said drive shaft has integrally-formed about a portion thereof a plurality of parallel, radially-disposed recessed splines configured to receive said ribs of said drive belt.

8. The conveyor roller system of claim 6 wherein a gearbelt pulley is mounted onto said drive shaft for driving said drive belt.

9. The conveyor roller system of claim 3 which includes a series of belts, each said belt coupling a successive pair of adjacent rollers.

10. The conveyor roller system of claim 3 wherein a single belt couples each of said rollers.

11. A method for driving a conveyor roller system having a plurality of parallel spaced-apart rollers connected axially between a pair of parallel frame members and which transport articles thereacross when said rollers are rotated, comprising:

(a) providing said rollers with a plurality of parallel, radially-disposed recessed splines integrally-formed about a portion thereof intermediate the ends of said rollers;

(b) engaging said recessed splines of said rollers with a belt having an inner and an outer surface to couple said rollers; and (c) rotating the coupled rollers with a drive coupled to at least one of said rollers.

12. The method of claim 11 wherein said inner surface of said belt is provided with ribs for engaging said recessed splines of said rollers.

13. The method of claim 11 wherein said drive is coupled to at least one of said rollers by a drive belt having an inner ribbed surface for engaging said recessed splines of said rollers.

14. The method of claim 13 wherein said drive is provided to be a drive motor having a drive shaft connected to said drive belt.

15. The method of claim 14 wherein a plurality of parallel, radially-disposed recessed splines configured to receive said ribs of said drive belt are integrally-formed about a portion of said drive shaft.

16. The method of claim 14 wherein a gearbelt pulley is mounted onto said drive shaft for driving said drive belt.

17. The method of claim 11 wherein a series of belts each coupling a successive pair of adjacent rollers are provided.

18. The method of claim 11 wherein a single belt coupling each of said rollers is provided.

19. The method of claim 11 wherein said parallel frame members are provided with upstanding walls for retaining articles being conveyed thereon.

20. The method of claim 11 wherein articles having a U-shaped cross-section are conveyed across said rollers.

21. The method of claim 22 wherein articles are conveyed directly on said outer surface of said belt.

* * * * *